(12) United States Patent
Kim et al.

(10) Patent No.: US 9,073,406 B2
(45) Date of Patent: Jul. 7, 2015

(54) AIR CONDITIONER CONTROLLING DEVICE FOR VEHICLE

(75) Inventors: Myung Hoe Kim, Seoul (KR); Seung Wook Kim, Suwon-si (KR); Hye Young Kim, Daejeon (KR)

(73) Assignees: HYUNDAI MOTOR COMPANY, Seoul (KR); KIA MOTORS CORPORATION, Seoul (KR); HALLA CLIMATE CONTROL CORP., Daejeon (KR)

( * ) Notice: Subject to any disclaimer, the term of this patent is extended or adjusted under 35 U.S.C. 154(b) by 449 days.

(21) Appl. No.: 13/551,430

(22) Filed: Jul. 17, 2012

(65) Prior Publication Data
US 2013/0174676 A1    Jul. 11, 2013

(30) Foreign Application Priority Data
Jan. 6, 2012    (KR) .................. 10-2012-0002031

(51) Int. Cl.
*F16H 35/18* (2006.01)
*G05G 1/10* (2006.01)
*B60H 1/00* (2006.01)

(52) U.S. Cl.
CPC .......... *B60H 1/0065* (2013.01); *Y10T 74/18288* (2015.01)

(58) Field of Classification Search
CPC .................. B60H 1/0065; Y10T 74/18288
USPC ...... 74/10 R, 10.29, 10.31, 10.33, 10.6, 10.9, 74/473.3, 501.6, 502.6, 504–506, 553, 74/567; 200/564, 565; 334/88; 40/331
See application file for complete search history.

(56) References Cited

U.S. PATENT DOCUMENTS

| | | | | |
|---|---|---|---|---|
| 3,529,478 A | * | 9/1970 | Hayakawa | 74/10.54 |
| 3,760,640 A | * | 9/1973 | Mayer et al. | 74/10.6 |
| 4,656,926 A | * | 4/1987 | Bauer et al. | 454/143 |
| 5,127,280 A | * | 7/1992 | Terano et al. | 74/89 |
| 5,313,900 A | | 5/1994 | Rendahl et al. | |
| 5,433,126 A | * | 7/1995 | Corbett | 74/501.6 |

FOREIGN PATENT DOCUMENTS

| | | |
|---|---|---|
| JP | 3033112 | 2/2000 |
| KR | 100165985 B1 | 9/1998 |
| KR | 1020080010129 A | 1/2008 |

* cited by examiner

*Primary Examiner* — Thomas R. Hannon
*Assistant Examiner* — Adam D Rogers
(74) *Attorney, Agent, or Firm* — Morgan, Lewis & Bockius LLP

(57) ABSTRACT

An air conditioner controlling device for a vehicle may include a knob rotatably installed on the front of a case, a cylindrical cam rotatably installed inside the case, interlocked with a shaft of the knob, and having a slot formed in an outer surface thereof, and a lever having one end rotatably mounted to the case and the other end insertedly coupled to the slot of the cylindrical cam to thereby reciprocate the cylindrical cam at the time of rotation of the cylindrical cam, wherein the lever may be insertedly mounted in a portion of the slot formed along the outer surface of the cylindrical cam, and a mounting position and angle of the lever may be thus adjusted, such that a reciprocation direction of the lever may be freely adjusted.

7 Claims, 5 Drawing Sheets

(a)

(b)

AIR CONDITIONER CONTROLLING DEVICE FOR VEHICLE

CROSS-REFERENCE TO RELATED APPLICATION

The present application claims priority to Korean Patent Application No. 10-2012-0002031, filed on Jan. 6, 2012, the entire contents of which is incorporated herein for all purposes by this reference.

BACKGROUND OF THE INVENTION

1. Field of the invention

The present invention relates to an air conditioner controlling device for a vehicle, and more particularly, to an air conditioner controlling device for a vehicle using a cylindrical cam.

2. Description of Related Art

In general, an air conditioner controlling device for a vehicle means a device used in order to adjust a temperature or an air volume.

The air conditioner controlling device for a vehicle according to the related art includes a plane cam rotatably fixed to a housing to thereby rotate according to an operation of a control, a gear rotating according to the rotation of the plane cam since a pivot fixed to a shaft of a knob and protruded from the shaft of the knob is inserted into a slot of the plane cam, and a cable connected to the gear to thereby be pushed or pulled at the time of the rotation of the gear, and may obtain smooth operational feeling in the case in which a size of the plane cam increases.

However, the air conditioner controlling device for a vehicle according to the related art has a limitation in increasing operational force of the cable due to a package limitation at the time of operation of the plane cam.

That is, in the case in which the size of the plane cam increases, operational force decreases, such that smooth operational feeling may be obtained. However, as the size of the plane cam increases, mounting of the housing becomes difficult, such that the package limitation becomes large.

In addition, in the case in which the size of the plane cam decreases, mounting of the housing becomes easy, such that the air conditioner controlling device for a vehicle may be configured in a package form; however, operational force increases to thereby deteriorate operational feeling.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an air conditioner controlling device for a vehicle capable of having decreased operational force to increase operational feeling and being configured in a package form by being manufactured using a cylindrical cam instead of a plane cam.

In one aspect of the present invention, the air conditioner controlling device for a vehicle, may include a knob rotatably installed on the front of a case, a cylindrical cam rotatably installed inside the case, interlocked with a shaft of the knob, and having a slot formed in an outer surface thereof, and a lever having one end rotatably mounted to the case and the other end insertedly coupled to the slot of the cylindrical cam to thereby reciprocate the cylindrical cam at the time of rotation of the cylindrical cam, wherein the lever is insertedly mounted in a portion of the slot formed along the outer surface of the cylindrical cam, and a mounting position and angle of the lever is thus adjusted, such that a reciprocation direction of the lever is freely adjusted.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
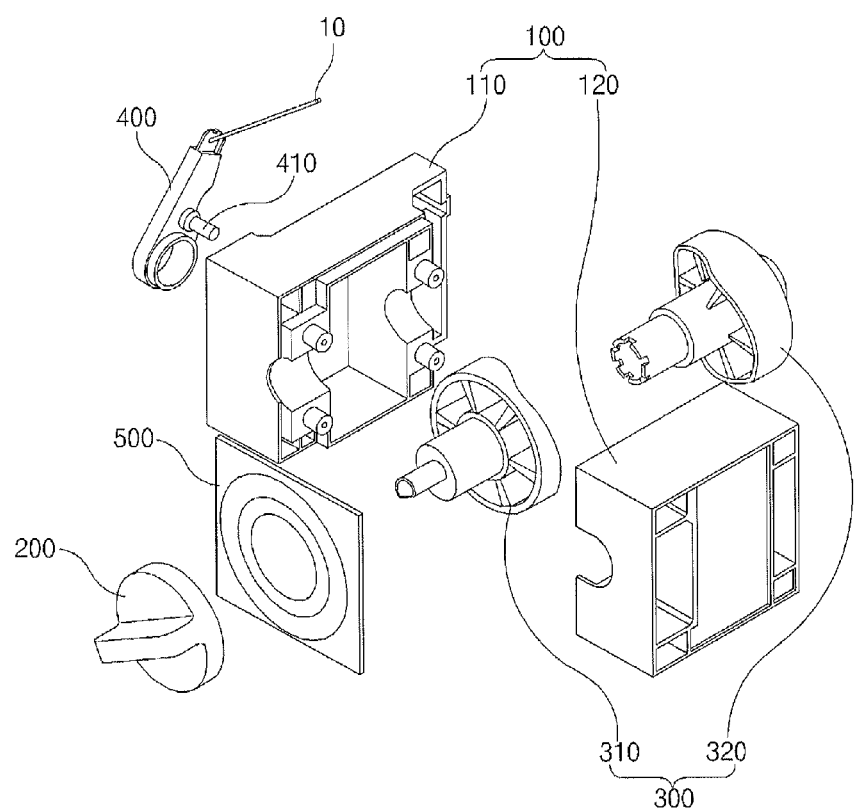
FIG. 1 is an exploded perspective view illustrating an air conditioner controlling device for a vehicle according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

An air conditioner controlling device for a vehicle according to an exemplary embodiment of the present invention includes a knob 200 rotatably installed on the front of a case 100, a cylindrical cam 300 rotatably installed in the case 100, interlocked with a shaft of the knob 200, and having a slot 330 formed in a main surface thereof, and a lever 400 having one end rotatably fixed to the case 100 and the other end insertedly mounted in the slot 330 of the cylindrical cam 300 to thereby reciprocate at the time of rotation of the cylindrical cam 300, wherein the lever 400 may be insertedly mounted in any one portion of the slot 330 formed along the main surface of the cylindrical cam 300, and a mounting position and angle of the lever 400 may be thus adjusted, such that a reciprocation direction of the lever 400 may be freely adjusted.

The cylindrical cam 300 is formed by combining lower and upper cams 310 and 320 with each other and includes the slot 330 formed along the main surface thereof between the lower and upper cams 310 and 320.

An operation length and an inclination angle between inflection points of the slot 330 may be adjusted according to a length of the cylindrical cam 300, such that a stroke distance and direction of the lever 400 may be adjusted.

The other end of the lever 400 is formed with a protrusion part 410 so as to be inserted into the slot 330.

The front of the case 100 on which the knob 200 is installed is provided with a display unit 500 for displaying a symbol of temperature or wind velocity.

The case 100 is formed by combining left and right cases 110 and 120 with each other.

The lever 400 is insertedly mounted in a slot 330 positioned at a side portion of the cylindrical cam 300 to thereby be adjusted so as to reciprocate forward and backward, is insertedly mounted in a slot 330 positioned at a lower portion of the cylindrical cam 300 to thereby be adjusted so as to reciprocate leftward and rightward, or is insertedly mounted in a slot 330 positioned at an inclination portion of the cylindrical cam 300 to thereby be adjusted so as to reciprocate in an inclined state.

Hereinafter, embodiments of the present invention will be described in detail with reference to the accompanying drawings so that they can be easily practiced by those skilled in the art to which the present invention pertains. However, the present invention may be modified in various different ways and is not limited to the exemplary embodiments provided in the present description. In the accompanying drawings, portions unrelated to the description will be omitted in order to obviously describe the present invention, and similar reference numerals will be used to describe similar portions throughout the present specification.

Since the air conditioner controlling device for a vehicle according to the exemplary embodiment of the present invention uses the cylindrical cam 300 in which the slot 330 is formed, a mounting position and a mounting angle of the lever may be freely adjusted and a reciprocating distance of the lever also may be adjusted without a change in a size of a case 100, such that the air conditioner controlling device for a vehicle may be configured in a package form.

Figure 2:
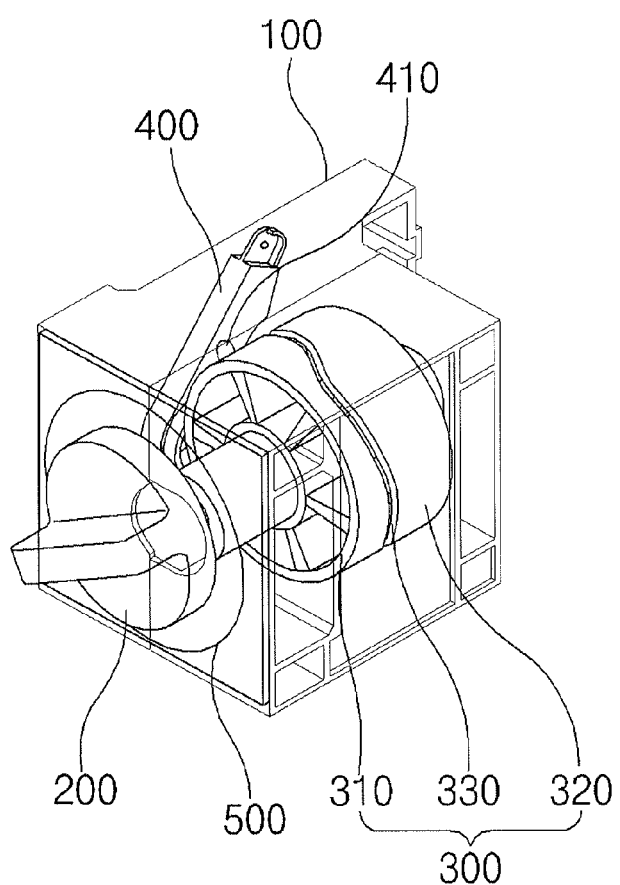
FIG. 2 is an assembled perspective view illustrating an air conditioner controlling device for a vehicle according to the exemplary embodiment of the present invention.

The air conditioner controlling device for a vehicle according to the exemplary embodiment of the present invention as described above includes the case 100 forming an appearance of the air conditioner controlling device, the knob 200 rotatably mounted on the case 100, the cylindrical cam 300 rotating together with the knob 200, the lever 400 reciprocating along the slot 330 of the cylindrical cam 300, and the display unit 500 displaying the symbols of the temperature and the wind velocity, as shown in FIGS. 1 and 2.

The case 100 is formed by combining the left and right cases 110 and 120 with each other.

The knob 200, which is to rotate the cylindrical cam 300 leftward and rightward, is rotatably installed on the front of the case 100 and has a shaft formed at the center thereof so that the cylindrical cam 300 is coupled thereto.

The cylindrical cam 300 is rotatably installed in the case 100 in a right and left direction, is interlocked with the shaft of the knob 200, and has the slot 330 formed in a main surface thereof, wherein the slot 330 is formed of a groove.

The slot 330 is formed in a wave shape along the main surface of the cylindrical cam 300, and an operation length and an inclination angle between inflection points of the slot 330 may be adjusted according to a length of the cylindrical cam 300, such that a stroke (reciprocating) distance and direction of the lever 400 to be described below may be adjusted.

That is, the cylindrical cam 300 is used, thereby making it possible to solve a problem that a size of the case 100 should be adjusted in order to adjust the stroke distance and direction of the lever 400. Therefore, the air conditioner controlling device for a vehicle according to the exemplary embodiment of the present invention may be configured in a package form.

The cylindrical cam 300 as described above is formed by combining the lower and upper cams 310 and 320 with each other and includes the slot 330 formed along the main surface thereof between the lower and upper cams 310 and 320, wherein the slot 330 is inserted with the protrusion part 410 formed at the other end of the lever 400.

Figure 3:
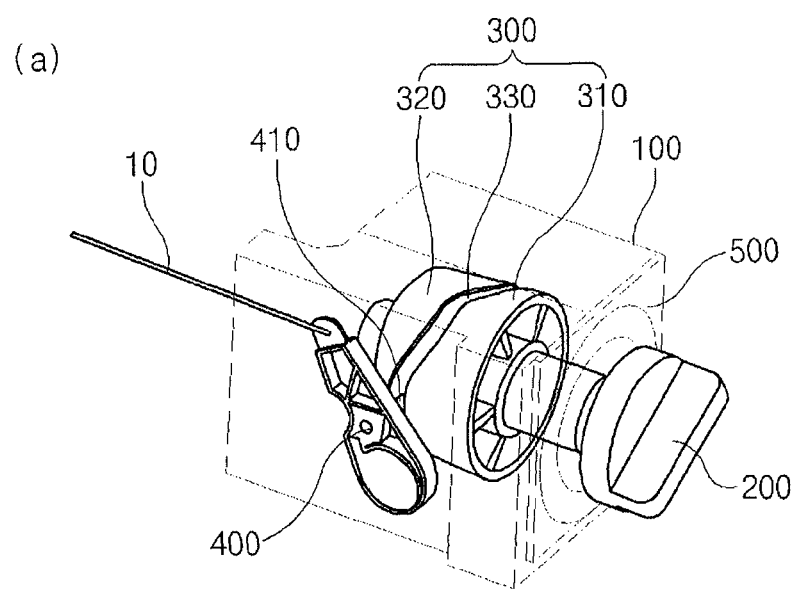
FIG. 3 is a perspective view illustrating a state in which a lever is mounted on a side in an air conditioner controlling device for a vehicle according to the exemplary embodiment of the present invention.
Figure 3:
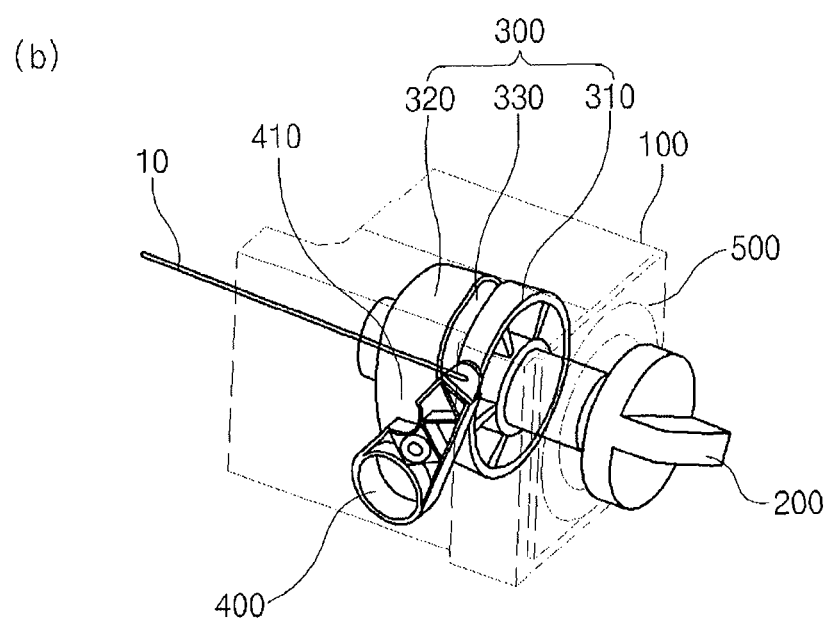
Figure 4:
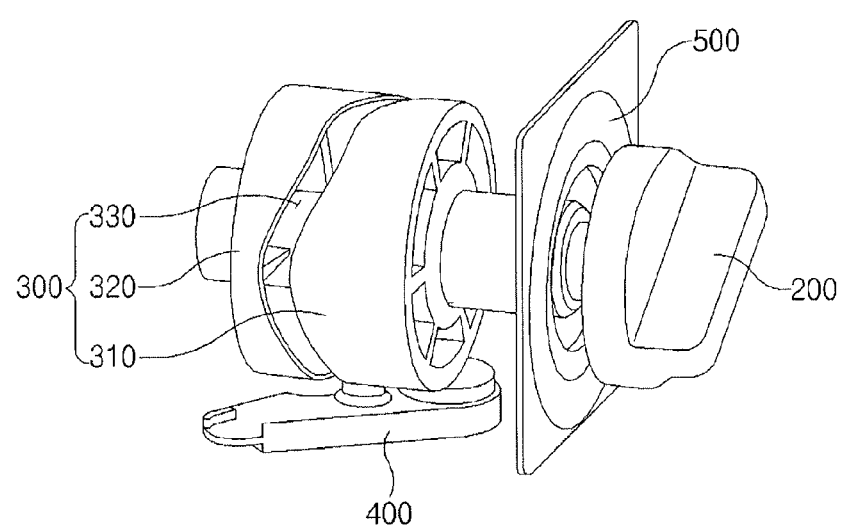
FIG. 4 is a perspective view illustrating a state in which a lever is mounted on a lower surface in an air conditioner controlling device for a vehicle according to the exemplary embodiment of the present invention.
Figure 5:
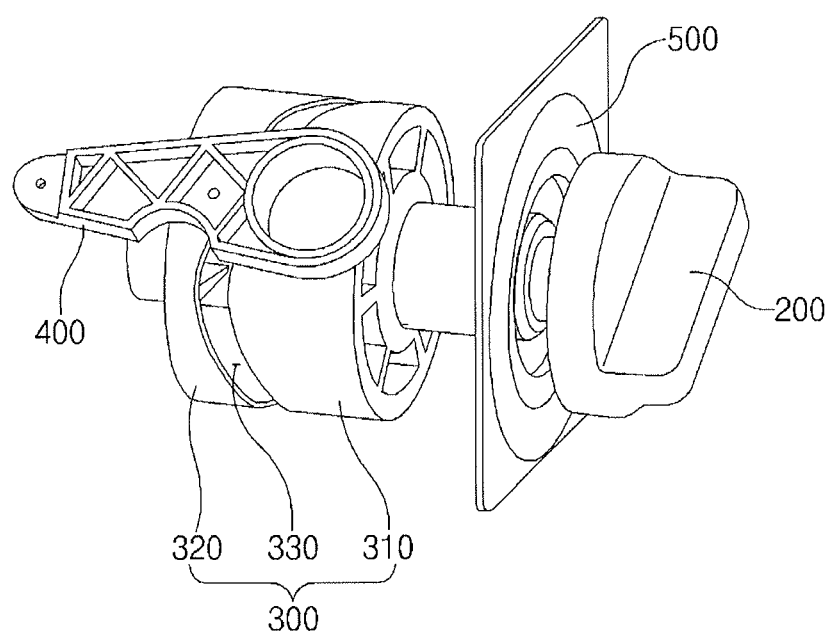
FIG. 5 is a perspective view illustrating a state in which a lever is mounted to be inclined in an air conditioner controlling device for a vehicle according to the exemplary embodiment of the present invention.

The lever 400, which is to pull or unwind a cable 10 connected to the air conditioner device while reciprocating according to rotation of the cylindrical cam 300, has one end rotatably connected to the case 100 and the other end formed with the protrusion part 410 coupled to any one portion of the slot 330, as shown in FIGS. 3 to 5, such that the lever 400 reciprocates while the protrusion part 410 moves along the slot 330 at the time of rotation of the cylindrical cam 300.

Here, the lever 400 adjusts its reciprocating direction according to a position at which it is mounted in the slot 330 of the cylindrical cam 300.

The lever 400 is insertedly mounted in the slot 330 positioned at the side portion of the cylindrical cam 300 as shown in FIGS. 3 to 5, such that the lever 400 may be adjusted to reciprocate forward and backward along the slot 330 at the time of the rotation of the cylindrical cam 300.

In addition, the lever 400 is insertedly mounted in the slot 330 positioned at the lower portion or the upper portion of the cylindrical cam 300 as shown in FIG. 4, such that the lever 400 may be adjusted to reciprocate leftward and rightward along the slot 330 at the time of the rotation of the cylindrical cam 300.

In addition, the lever 400 is insertedly mounted in the slot 330 positioned at the inclination portion or the upper portion of the cylindrical cam 300 as shown in FIG. 5, such that the lever 400 may be adjusted to reciprocate in an inclined state along the slot 330 at the time of the rotation of the cylindrical cam 300.

That is, the lever 400 may be insertedly mounted in any one portion of the slot 330 formed along the main surface of the cylindrical cam 300, such that the mounting position and the mounting angle of the lever 400 may be freely adjusted and the reciprocating direction of the lever 400 may be freely adjusted.

Therefore, the cylindrical cam 300 is used to increase a degree of freedom in mounting of the lever 400 and thus increase efficiency of a package configuration.

The display unit 500, which displays a symbol representing a temperature or wind velocity, is attached on the front of the case 100 on which the knob 200 is positioned.

An operation state of the air conditioner controlling device for a vehicle having the configuration as described above will be described by way of example of a configuration of FIG. 3 in which the lever is mounted in the side.

First, as shown in FIG. 3A, when the knob 200 rotates in a counterclockwise direction, the cylindrical cam 300 rotates together with the knob 200. At this time, the lever 300 rotates backward along the slot 330 of the cylindrical cam 300, such that the cable 10 may move backward to thereby be unwound.

In this state, as shown in FIG. 3B, when the knob 200 rotates in the counterclockwise direction, the cylindrical cam 300 rotates together with the knob 200. At this time, the lever 300 rotates forward along the slot 330 of the cylindrical cam 300, such that the cable 10 may move forward to thereby be pulled.

Meanwhile, the lever 400 rotates leftward and rightward by the cylindrical cam 300 having a cylindrical shape simultaneously with rotating forward and backward in the slot 330, such that the cable 10 may rotate forward and backward or leftward and rightward, thereby making it possible to control the cable 10 according to a direction in which the cable 10 is pulled.

For convenience in explanation and accurate definition in the appended claims, the terms "left" and "right" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An air conditioner controlling device for a vehicle, comprising:
    a knob rotatably installed on a front of a case;
    a cylindrical cam rotatably installed inside the case, interlocked with a shaft of the knob, and having a slot formed in an outer surface thereof; and
    a lever having one end rotatably mounted to the case and another end insertedly coupled to the slot of the cylindrical cam to thereby reciprocate the lever at a time of rotation of the cylindrical cam,
    wherein the another end of the lever is insertedly mounted in a portion of the slot formed along the outer surface of the cylindrical cam, and a mounting position and angle of the lever is thus adjusted, such that a reciprocation direction of the lever is freely adjusted, and
    wherein the cylindrical cam is formed by combining a lower cam and an upper cam with each other and includes the slot formed along the outer surface of the cylindrical cam between the lower and upper cams.

2. The air conditioner controlling device for the vehicle according to claim 1, wherein the another end of the lever is formed with a protrusion part slidably inserted into the slot.

3. The air conditioner controlling device for the vehicle according to claim 1, wherein the front of the case on which the knob is installed is provided with a display unit for displaying a symbol of temperature or wind velocity.

4. The air conditioner controlling device for the vehicle according to claim 1, wherein the case is formed by combining a left case and a right case with each other.

5. The air conditioner controlling device for the vehicle according to claim 1, wherein the lever is insertedly mounted in the slot positioned at a side portion of the cylindrical cam to thereby be adjusted so as to reciprocate forward and backward.

6. The air conditioner controlling device for the vehicle according to claim 1, wherein the lever is insertedly mounted in the slot positioned at an end portion of the cylindrical cam in an axial direction of the cylindrical cam to thereby be adjusted so as to reciprocate leftward and rightward.

7. The air conditioner controlling device for the vehicle according to claim 1, wherein the lever is insertedly mounted in the slot of the cylindrical cam and a protrusion part of the lever is engaged in the slot to thereby be adjusted so as to reciprocate while the protrusion part follows a contour of the slot.

* * * * *